(12) United States Patent
Hwang et al.

(10) Patent No.: US 11,645,508 B2
(45) Date of Patent: May 9, 2023

(54) ELECTRONIC APPARATUS AND METHOD FOR GENERATING TRAINED MODEL

(71) Applicant: Korea Advanced Institute of Science and Technology, Daejeon (KR)

(72) Inventors: Sungju Hwang, Daejeon (KR); Haebum Lee, Daejeon (KR); Donghyun Na, Daejeon (KR); Eunho Yang, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 1294 days.

(21) Appl. No.: 16/002,614

(22) Filed: Jun. 7, 2018

(65) Prior Publication Data

US 2018/0357538 A1 Dec. 13, 2018

Related U.S. Application Data

(60) Provisional application No. 62/517,442, filed on Jun. 9, 2017.

(30) Foreign Application Priority Data

Jan. 29, 2018 (KR) .................. 10-2018-0010925

(51) Int. Cl.
*G06N 3/08* (2023.01)
*G06F 17/16* (2006.01)
(Continued)

(52) U.S. Cl.
CPC ............. *G06N 3/08* (2013.01); *G06F 17/16* (2013.01); *G06N 3/04* (2013.01); *G06N 3/045* (2023.01)

(58) Field of Classification Search
CPC .......... G06N 3/08; G06N 3/04; G06N 3/0454; G06F 17/16
See application file for complete search history.

(56) References Cited

U.S. PATENT DOCUMENTS 6,018,728 A  1/2000 Spence et al.
2017/0032035 A1* 2/2017 Gao ................... G06F 16/3347
(Continued)

FOREIGN PATENT DOCUMENTS

KR  10-1999-0082557 A  11/1999
KR  10-2017-0062911 A  6/2017

OTHER PUBLICATIONS

Leen, Gayle. "Focused Multi-task Learning Using Gaussian Processes", 2011, Springer, Academic, 16 (Year: 2011).*
(Continued)

*Primary Examiner* — Ying Yu Chen
*Assistant Examiner* — Shamcy Alghazzy
(74) *Attorney, Agent, or Firm* — Jefferson IP Law, LLP

(57) ABSTRACT

A method for generating a trained model is provided. The method for generating a trained model includes: receiving a learning data; generating an asymmetric multi-task feature network including a parameter matrix of the trained model which permits an asymmetric knowledge transfer between tasks and a feedback matrix for a feedback connection from the tasks to features; computing a parameter matrix of the asymmetric multi-task feature network using the input learning data to minimize a predetermined objective function; and generating an asymmetric multi-task feature trained model using the computed parameter matrix as the parameter of the generated asymmetric multi-task feature network.

9 Claims, 14 Drawing Sheets

(51) Int. Cl.
*G06N 3/04* (2023.01)
*G06N 3/045* (2023.01)

(56) References Cited

U.S. PATENT DOCUMENTS

2017/0124432 A1  5/2017  Chen et al.
2017/0154423 A1  6/2017  Heo et al.

OTHER PUBLICATIONS

Peng—Unsupervised Cross-Dataset Transfer Learning for Person Re-Identification (Year: 2016).*
Xue—Multi-Task Learning for Classification with Dirichlet Process Priors (Year: 2007).*
Saito—Asymmetric Tri-training for Unsupervised Domain Adaptation (Year: 2017).*
Lee et al., Asymmetric Multi-task Learning Based on Task Relatedness and Loss, New York, NY, USA, 2016.
Yang et al., Trace Norm Regularised Deep Multi-Task Learning, , Workshop track—ICLR 2017, Feb. 17, 2017.

* cited by examiner

RMSE

SCALABILITY

FIG. 11

| Models | AWA-Attr. | MNIST | School | ImageNet-Room |
|---|---|---|---|---|
| STL | 37.57±0.49 | 14.76±0.62 | 10.16±0.08 | 45.85±1.36 |
| Go-MTL | 35.57±0.24 | 14.44±1.34 | 9.87±0.06 | 47.05±1.35 |
| AMTL | N/A | 12.92±1.37 | 10.13±0.08 | 40.80±1.46 |
| NN | 26.25±0.34 | 12.32±1.26 | 9.89±0.03 | 46.05±2.61 |
| Multi-task NN | 26.18±0.28 | 11.96±0.84 | 9.91±0.04 | 41.70±3.02 |
| AMTFL | 25.11±0.19 | 10.80±1.03 | 9.91±0.04 | 40.00±3.01 |

FIG. 12

|  | CIFAR-100 | AWA | ImageNet-Small |
|---|---|---|---|
| CNN | 19.65 | 11.36 | 66.54 |
| MT-CNN | 19.65 | 10.54 | 65.69 |
| Deep-AMTL | 19.51 | 10.27 | 65.61 |
| Deep-AMTFL | 19.20 | 9.96 | 64.49 |

ELECTRONIC APPARATUS AND METHOD FOR GENERATING TRAINED MODEL

CROSS-REFERENCE TO RELATED APPLICATIONS

This application claims priority from Korean Patent Application No. 10-2018-0010925, filed on Jan. 29, 2018 in the Korean Intellectual Property Office and U.S. Provisional Application No. 62/517,442, filed on Jun. 9, 2017, in the USPTO the disclosure of which is incorporated herein by reference in its entirety.

BACKGROUND OF THE INVENTION

Field of the Invention

Apparatuses and methods consistent with the present disclosure relate to an electronic apparatus and a method for generating a trained model, and more particularly, to an electronic apparatus and a method for generating a trained model capable of performing task learning while reducing a negative transfer by enhancing an asymmetric knowledge transfer.

Description of the Related Art

As one field of machine learning, there is multi-task learning, which utilizes an inter-task knowledge transfer using relevance of different tasks.

As a representative type of the multi-task learning, there is a learning task grouping and overlap in multi-task learning (GO-MTL) model which learns common features and allows different tasks to share and select the learned common features. This GO-MTL model may be considered that a nonlinear variation is added to a neural network having one hidden layer.

However, the GO-MTL model has a great difference in difficulty between tasks and exhibits less degraded performance than independently learning tasks when incorrectly learned parameter information for a specific task is transferred to another task. This is called a negative transfer and is an important problem to be solved in the multi-task learning.

Recently, an asymmetric multi-task learning (AMTL) model has been used to solve the above-mentioned negative transfer.

Unlike the GO-MTL, the AMTL model utilizes a direct knowledge transfer from other task parameters without each task passing through common features. For example, a task of predicting zebra (general horse+stripe) is induced to be close to a linear combination of parameters of a task predicting the general horse and parameters of a task predicting tiger (stripe).

The ATM model enables an inter-task asymmetric knowledge transfer, unlike common feature learning. Although each task is related to each other, the ATM model transfers knowledge only in a direction of a difficult task in an easy task, and prevents knowledge from being transferred to another task in the difficult task, thereby solving the problem of the negative transfer with the existing feature sharing-based models.

However, the AMTL model is useful for solving the negative transfer, but has the following problems.

First, the AMTL does not assume an explicit feature, and therefore is not appropriate to be originally applied to a deep neural network.

Second, since a size of each inter-task transition matrix that the AMTL should have is quadratically increased when the number of tasks is increased, a memory and time cost required for learning are not efficient.

Third, the common feature-based model better reflects an actual case than the direct inter-task knowledge transfer, and thus better matches the human intuition.

Therefore, a new model which can be applied to the deep neural network while solving the negative transfer is required.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

An object of the present invention is to provide an electronic apparatus and a method for generating a trained model capable of performing task learning while reducing a negative transfer by enhancing an asymmetric knowledge transfer.

According to an aspect of the present disclosure, a method for generating a trained model includes: receiving a learning data; generating an asymmetric multi-task feature network including a parameter matrix of the trained model which permits an asymmetric knowledge transfer between tasks and a feedback matrix for a feedback connection from the tasks to features; computing a parameter matrix of the asymmetric multi-task feature network using the input learning data to minimize a predetermined objective function; and generating an asymmetric multi-task feature trained model using the computed parameter matrix as the parameter of the generated asymmetric multi-task feature network.

The predetermined objective function may include a loss function for the trained model permitting the inter-task asymmetric knowledge transfer, an auto-encoder term using the feedback matrix and inducing a nonlinear combination of the task parameters, and a weight decay regularization term.

The predetermined objective function may be as the following Equation.

$$\min_{A, \{W^{(l)}\}_{l=1}^{L}} \sum_{t=1}^{T} (1 + \alpha \|a_t^o\|_1) \{\mathcal{L}(w_t^{(L)}; Z_t, y_t) + \hat{\mathcal{L}}_t\} + \gamma \|\sigma(f(ZW^{(L)})A) - Z\|_2^2 + \lambda \sum_{l=1}^{L} \|W^{(l)}\|_F^2,$$

In the above Equation, Z may represent the matrix of the asymmetric multi-task feature network configured of a multi layer, $W^{(L)}$ may represent a weight matrix for the last layer of the asymmetric multi-task feature network, A may represent the feedback matrix, $a_i^o \in \mathbb{R}^{1 \times K}$ may represent a t-th row of an A vector, $\mathcal{L}_t$ may represent an average validation loss of single task learning for a task t, $\mathcal{L}_t := \mathcal{L}(w_t^{(L)}, W^{(L-1)} \ldots W^{(1)}; X_t, y_t)$, σ may represent a nonlinear function, and α, γ, λ may each represent model parameters for adjusting weights of each term.

The asymmetric multi-task feature network may include a plurality of hidden layers.

According to an aspect of the present disclosure, an electronic apparatus includes: a memory storing a learning data; and a processor generating an asymmetric multi-task feature network which has a parameter matrix of a trained model permitting an asymmetric knowledge transfer between tasks and a feedback matrix for a feedback connection from the tasks to features, computing a parameter matrix of the asymmetric multi-task feature network using the stored learning data to minimize a predetermined objective function, and generating an asymmetric multi-task feature trained model using the computed parameter matrix as the parameters of the generated asymmetric multi-task feature network.

The predetermined objective function may include a loss function for the trained model permitting the inter-task asymmetric knowledge transfer, an auto-encoder term using the feedback matrix and inducing a nonlinear combination of the task parameters, and a weight decay regularization term.

The predetermined objective function may be as the following Equation.

$$\min_{A, \{W^{(l)}\}_{l=1}^{L}} \sum_{t=1}^{T} (1 + \alpha \|a_t^o\|_1) \{ \mathcal{L}(w_t^{(L)}; Z_t, y_t) + \hat{\mathcal{L}}_t \} + $$
$$\gamma \|\sigma(f(ZW^{(L)})A) - Z\|_2^2 + \lambda \sum_{l=1}^{L} \|W^{(l)}\|_F^2,$$

In the above Equation, Z may represent the matrix of the asymmetric multi-task feature network configured of a multi layer, $W^{(L)}$ may represent a weight matrix for the last layer of the asymmetric multi-task feature network, A may represent the feedback matrix, $\alpha_t^o \in \mathbb{R}^{1 \times K}$ may represent a t-th row of an A vector, $\mathcal{L}_t$ may represent an average validation loss of single task learning for a task t, $\mathcal{L}_t := \mathcal{L}(w_t^{(L)}, W^{(L-1)} \ldots W^{(1)}: X_t, y_t)$, σ may represent a nonlinear function, and α, γ, λ may each represent model parameters for adjusting weights of each term.

The asymmetric multi-task feature network may include a plurality of hidden layers.

According to an aspect of the present disclosure, there is provided a computer readable recording medium including a program for executing a method for generating a trained model in an electronic apparatus, wherein the method for generating a trained model includes: receiving a learning data; generating an asymmetric multi-task feature network including a parameter matrix of the trained model which permits asymmetric knowledge transfer between tasks and a feedback matrix for a feedback connection from the tasks to features; computing a parameter matrix of the asymmetric multi-task feature network using the input learning data to minimize a predetermined objective function; and generating an asymmetric multi-task feature trained model using the computed parameter matrix as the parameter of the generated asymmetric multi-task feature network.

As described above, according to various embodiments of the present disclosure, the trained model can solve the negative transfer caused by the symmetrical influence of each task during the learning process for the features, and be applied to the deep neural network.

Further, the effects that may be obtained or expected by the exemplary embodiments of the present disclosure shall be directly or implicitly disclosed in the detailed description of the present disclosure. For example, various effects that may be expected by the exemplary embodiments of the present disclosure shall be disclosed in the detailed description to be described below.

In addition, the technical problem to be solved in the present disclosure is not limited to the above-mentioned technical problems, and other technical problems can be clearly understood to those skilled in the art to which the present disclosure pertains from the following description.

BRIEF DESCRIPTION OF THE DRAWING FIGURES

The above and/or other aspects of the present invention will be more apparent by describing certain exemplary embodiments of the present invention with reference to the accompanying drawings, in which:

FIG. 11 is a diagram illustrating experimental results of two models applied to an actual data set;

FIG. 12 is a diagram illustrating quantitative evaluation in a plurality of deep models;

DETAILED DESCRIPTION OF THE EXEMPLARY EMBODIMENTS

Figure 1:
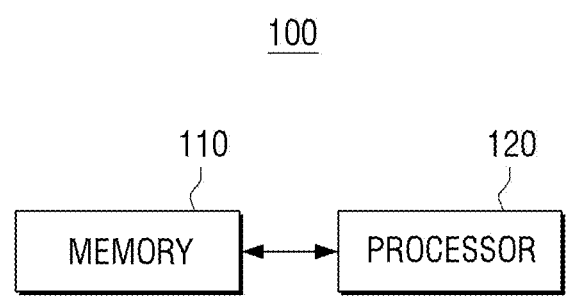
FIG. 1 is a block diagram illustrating a simple configuration of an electronic apparatus according to an embodiment of the present disclosure.

Terms used in the present specification are briefly described and then the present disclosure will be described in detail.

Terms used in embodiments of the present disclosure are selected as general terminologies currently widely used in consideration of the configuration and functions of the present disclosure, but can be different depending on intention of those skilled in the art, a precedent, appearance of new technologies, and the like. Further, in specific cases, terms arbitrarily selected by an applicant are present. In this case, the detailed meaning of the terms will be described in the description of the present disclosure. Therefore, terms used in the present disclosure are defined based on a meaning of the terms and contents described in the present disclosure, not simply based on names of the terms.

The embodiments of the present disclosure may be variously modified and have several forms. Therefore, specific embodiments of the present disclosure will be illustrated in the accompanying drawings and be described in detail in the present specification. However, it is to be understood that the present disclosure is not limited to a specific embodiment, but includes all modifications, equivalents, and substitutions without departing from the scope and spirit of the present disclosure. When it is decided that the detailed description of the known art related to the present disclosure may obscure the gist of the present disclosure, a detailed description therefor will be omitted.

Terms 'first', 'second', and the like, may be used to describe various components, but the components are not to be construed as being limited by the terms. The terms are used to distinguish one component from another component.

Singular forms are intended to include plural forms unless the context clearly indicates otherwise. It will be further understood that the terms "comprises" or "have" used in this specification, specify the presence of features, numerals, steps, operations, components, parts mentioned in this specification, or a combination thereof, but do not preclude the presence or addition of one or more other features, numerals, steps, operations, components, parts, or a combination thereof.

In the embodiments of the present disclosure, a 'module' or a 'unit' performs at least one function or operation and may be implemented by hardware or software or a combination of the hardware and the software. Further, a plurality of 'modules' or a plurality of 'units' are integrated into at least one module except for the 'module' or 'unit' which needs to be implemented by specific hardware and thus may be implemented by at least one processor.

Hereinafter, embodiments of the present disclosure will be described in detail with reference to the accompanying drawings so that those skilled in the art may easily practice the present disclosure. However, the present disclosure may be modified in various different ways and is not limited to embodiments provided in the present description. In the accompanying drawings, portions unrelated to the description will be omitted in order to obviously describe the present disclosure, and similar reference numerals will be used to describe similar portions throughout the present specification.

Hereinafter, exemplary embodiments of the present disclosure will be described in more detail with reference to the accompanying drawings.

FIG. 1 is a block diagram illustrating a simple configuration of an electronic apparatus according to an embodiment of the present disclosure.

Referring to FIG. 1, an electronic apparatus 100 may include a memory 110 and a processor 120. Here, the electronic apparatus 100 may be a data computable PC, a notebook PC, a server, or the like.

The memory 110 may store a learning data set for learning the trained model, and may store data for classification or recognition using the corresponding trained model.

The memory 110 may store a trained model which permits an inter-task asymmetric knowledge transfer. Here, the trained model may be asymmetric multi-task learning (AMTL). On the other hand, the trained model may be referred to as a network.

The memory 110 may generate an asymmetric multi-task feature trained model (i.e., asymmetric multi-task feature learning (AMTFL)) generated by the processor 120. The generated AMTFL model may have one hidden layer or a plurality of hidden layers.

In addition, the memory 110 may store a program necessary for performing trained model optimization.

The memory 110 may be implemented in a storage medium and an external storage medium in the electronic apparatus 100, for example, a removable disk including a USB memory, a storage medium connected to a host, a web server through a network, and the like.

The processor 120 controls each component of the electronic apparatus 100. Specifically, when a boot command is input from the user, the processor 120 may perform booting using an operating system stored in the memory 110.

The processor 120 may receive various parameters necessary for generating the asymmetric multi-task feature network through the manipulation input unit 140 to be described later. Here, the received various parameters may be hyper parameters or the like.

Figure 4:
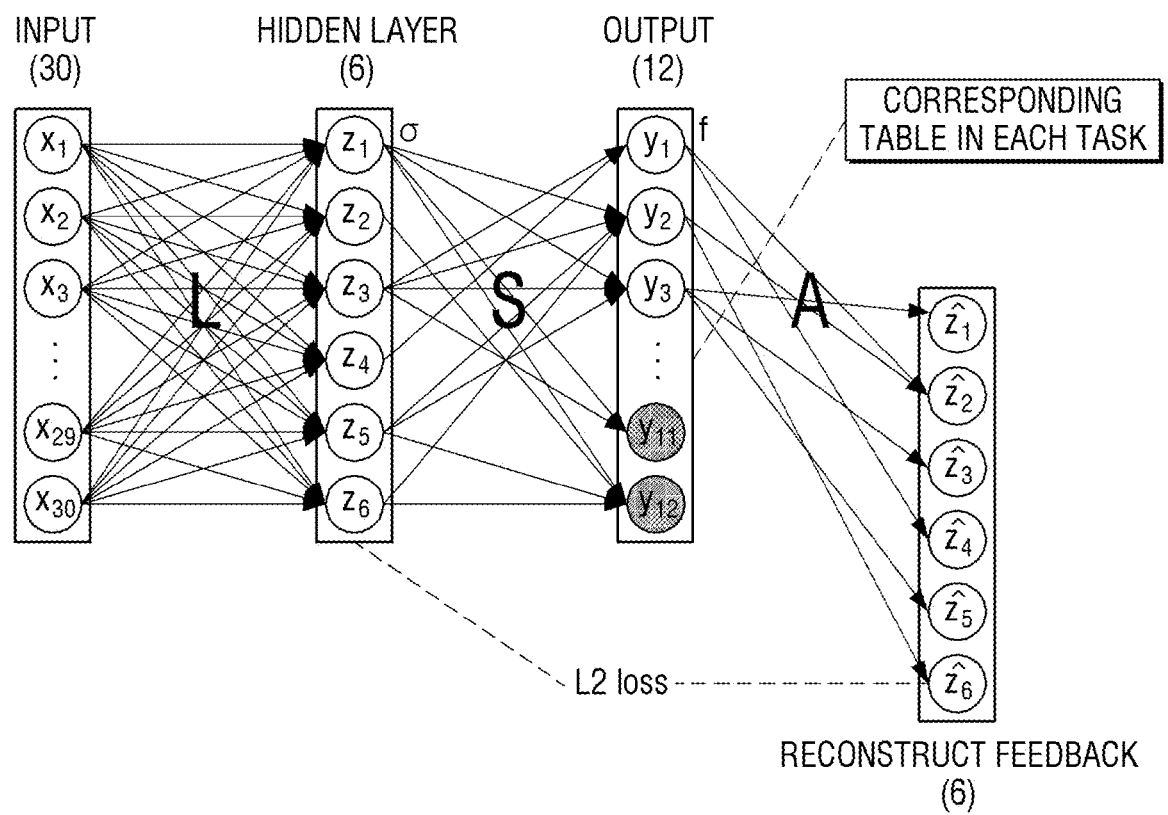
FIG. 4 is a diagram illustrating a feedback reconstruction according to an exemplary embodiment of the present disclosure.

When receiving various information, the processor 120 may generate the asymmetric multi-task feature network which has a parameter matrix of a trained model permitting the inter-task asymmetric knowledge transfer and a feedback matrix for a feedback connection from a task to a feature. Specifically, a neural network with the feedback connection may be created as illustrated in FIG. 4 may be generated.

Here, the trained model which permits the inter-task asymmetric knowledge transfer among tasks is a trained model based on the AMTL model.

The feedback matrix is for the feedback connection from the task to the feature and may be a feedback connection matrix for a feature space z.

The processor 120 computes the parameter matrix of the asymmetric multi-task characteristic network using the learning data stored to minimize a predetermined objective function. At this time, the processor 120 may minimize the objective function by using a stochastic gradient descent method.

Here, the objective function may include a loss function for the trained model permitting the inter-task asymmetric knowledge transfer, an auto-encoder term using the feedback matrix and inducing a nonlinear combination of the task parameters, and a weight decay regularization term, and may be represented by the following Equation 7. Specific contents of the objective function will be described later with reference to FIGS. 3 and 4.

The processor 120 generates the asymmetric multi-task feature trained model using the computed parameter matrix as a parameter of the generated asymmetric multi-task feature network.

The processor 120 may use the generated trained model to perform various processes such as vision recognition, speech recognition, and natural language processing. Specifically, if the trained model is related to image classification, the processor 120 may classify what the input image is based on the generated trained model and the input image.

As described above, the electronic apparatus 100 according to the present disclosure may solve a negative transfer caused by the symmetrical influence of each task during the learning process for the feature. Further, the electronic apparatus 100 according to the present disclosure may generate a trained model in which the negative transfer is resolved, and thus may generate a trained model similar to an actual model.

Meanwhile, only the simple components configuring the electronic apparatus are illustrated and described, but in the implementation, various components may be additionally provided. This will be described below with reference to FIG. 2.

Figure 2:
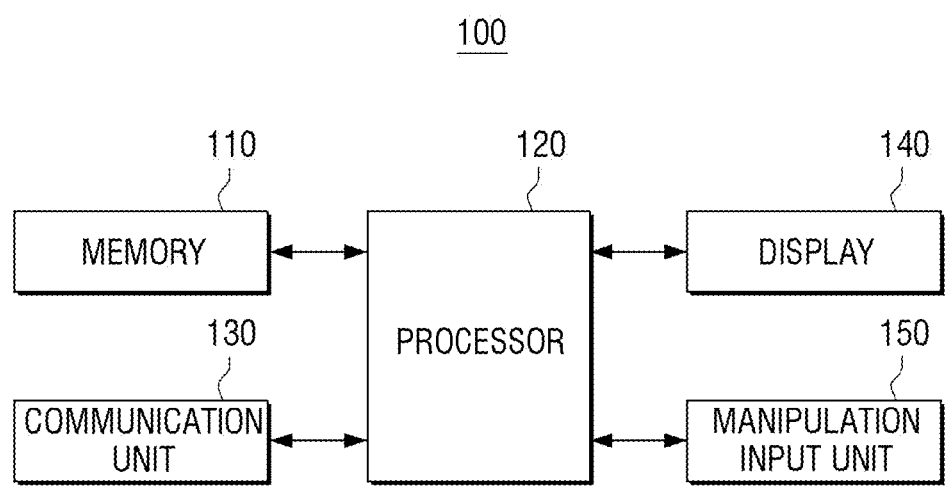
FIG. 2 is a block diagram illustrating a detailed configuration of the electronic apparatus according to the embodiment of the present disclosure.

FIG. 2 is a block diagram illustrating a detailed configuration of the electronic apparatus according to the embodiment of the present disclosure.

Referring to FIG. 2, the electronic apparatus 100 may include the memory 110, the processor 120, a communication unit 130, a display 140, and the manipulation input unit 150.

The operations of the memory 110 and the processor 120 have been described with reference to FIG. 1, and a redundant description thereof will be omitted.

The communication unit 130 is connected to other electronic apparatuses and may receive the learning data from other electronic apparatuses.

The communication unit 130 may receive information for processing using the trained model and transmit the processed results to other electronic apparatuses. For example, if the corresponding trained model is a model for classifying an image, the communication unit 130 may receive the image to be classified from other electronic apparatuses and transmits information about the classification result to other electronic apparatuses.

The communication unit 130 is configured to connect the electronic apparatus 100 to an external device and can be connected to a terminal device through a local area network (LAN) and an Internet network as well as a universal serial bus (USB) port or wireless communication (for example, WiFi 802.11a/b/g/n, NFC, Bluetooth) ports.

The display 140 displays various kinds of information which is provided from the electronic apparatus 100. Specifically, the display 140 may display a user interface window for selecting various kinds of information that the electronic apparatus 100 provides. Specifically, the corresponding user interface window may include an item for receiving a parameter required for generating the trained model.

The display 140 may be a monitor such as an LCD, a CRT, and an OLED and may be implemented as a touch screen which may simultaneously perform a function of the manipulation input unit 150 to be described below.

In addition, the display 140 may display information on test results using the trained model. For example, if the corresponding trained model was a model for classifying images, the display 140 may display the classification results for the input images.

The manipulation input unit 150 may receive various parameters necessary for generating a trained model from a user.

The manipulation input unit 150 may be implemented as a plurality of buttons, a keyboard, a mouse, and the like and may also be implemented as the touch screen which may simultaneously perform the function of the display 140 described above.

Meanwhile, illustrating and describing FIGS. 1 and 2, the electronic apparatus 100 includes only one processor. However, the electronic apparatus may include a plurality of processors, and a GPU in addition to a general CPU may be used.

Hereinafter, the learning method that can solve the negative transfer problem will be described below.

The multi-task learning permits several kinds of knowledge transfer simultaneously with performing joint training to improve generalization performance of several task predictors. One of the important problems in the multi-task learning is the negative transfer problem which explains situations where a correct predictor for an easy task is negatively affected by an incorrect predictor for a more difficult task.

The asymmetric multi-task learning (AMTL), which is a recently introduced method, solves this negative transfer problem by permitting the asymmetric knowledge transfer between tasks through inter-task parameter regularization. In particular, the AMTL designates task parameters for each task so that the task parameters for each task are represented by a sparse combination of parameters for other tasks to learn a directed graph which determines the amount of knowledge transfer between tasks.

However, the inter-task transfer model is limited in many respects. First of all, in most cases, the tasks are somewhat related to each other, but have no strict causal relationship. Therefore, it is more natural to assume that the tasks may be generated from a common temporal basic set rather than to assume that they are generated from a set of related tasks, like being assumed in a mutual task transmission model.

For example, when one task is predicting whether a person has a fatty liver and the other is predicting whether a patient has diabetes in light of the patient's health record, the two tasks are correlated with each other but do not have a clear cause and effect relationship. Rather, it may be caused by common factors such as obesity.

In addition, the AMTL is not expanded well as the number of tasks of the AMTL is increased since an inter-task knowledge transfer graph is Sparsity helps reduction of the number of parameters but does not reduce the intrinsic complexity of the problem.

Finally, the inter-task transition model stores knowledge in the learned model parameters and their relational graphs. Sometimes, however, it may be useful to store the learned contents as an explicit representation format that may be used for other tasks such as the transition learning.

Accordingly, the present disclosure is to prevent the negative transfer by enhancing the asymmetric knowledge transfer based on a multi-task feature learning approach that aims to learn latent features which are one of the most common methods for sharing knowledge between tasks in a multi-task learning framework. In particular, task predictors having high reliability have more influence on shared function learning in a state in which an influence of task predictors having low reliability on the shared function learning is reduced in order to have little or no contribution to the feature learning.

For this operation, the present disclosure proposes an efficient model capable of solving the negative transfer problem while being the common feature-based mode. This model is referred to as asymmetric multi-task feature learning (AMTFL) in that it learns features while having the merits of the AMTL.

This AMTFL model will be described below with reference to FIG. 3.

Figure 3:
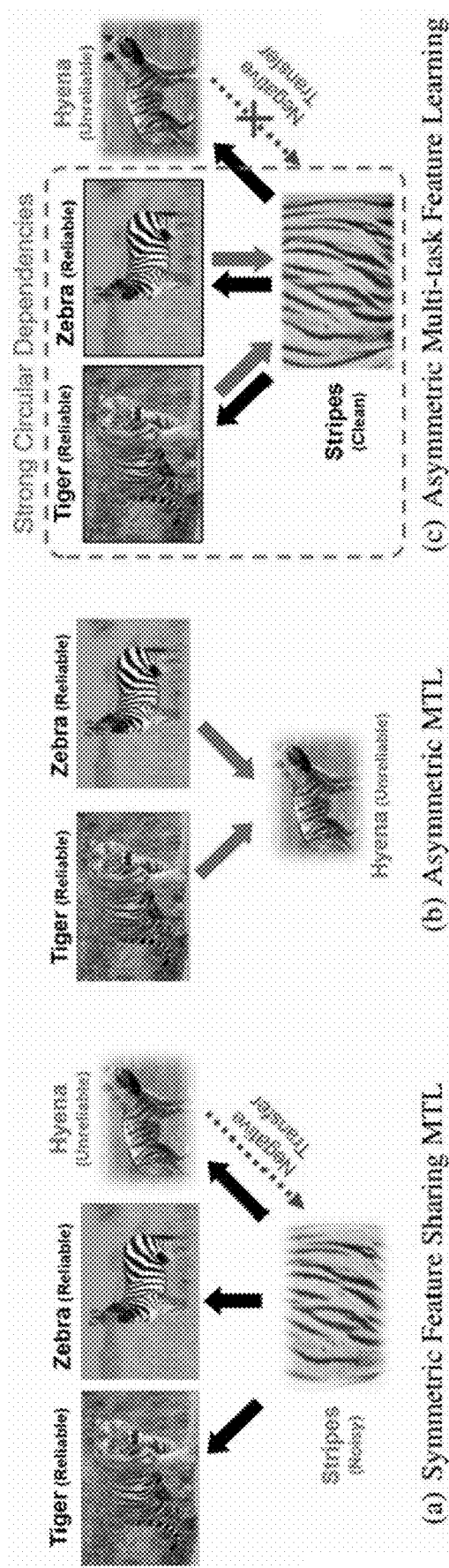
FIG. 3 is a diagram for explaining an asymmetric multi-task feature learning method according to the present disclosure.

FIG. 3 is a diagram for explaining an asymmetric multi-task feature learning method according to the present disclosure.

Referring to FIG. 3, it is assumed that there are tasks to discriminate tigers, zebras, and hyenas, respectively, and the tasks commonly share a feature of 'stripe'.

In this case, the conventional common feature-based multi-task trained model a treats tasks having different difficulties alike, and therefore a difficult hyena task is prone to transfer incorrect information to the stripe feature. Specifically, the reason is that the hyenas may have individuals without stripes and there are many cases where the stripes blur even if the hyenas have the stripes.

Therefore, since the existing AMTL model does not assume the explicit feature, the asymmetric knowledge transfer from the easy task to the difficult task occurs as illustrated in FIG. 3B. As a result, since the hyenas simply receive knowledge, the conventional AMTL model can effectively cope with the negative transfer problem, but since the hyenas do not have common features (stripes), the AMTL model may be considered to be inefficient in terms of learning.

In order to solve this problem, the AMTFL of the present disclosure allows all the tasks to commonly use the feature of the stripes as illustrated in FIG. 3C and configures an additional feedback connection again inferring stripes by using the results learned from tigers and zebras that are easy tasks.

This additional feedback connection forms a strong cycling-dependent relationship between the easier tasks and the stripe feature, thereby relatively weakening the influence of difficult tasks such as the hyenas on the stripe feature.

This point of view will be described by being substituted into a person's point of view.

A person learns the concept of the stripes through various visual information, and then infers the stripes again through easy concepts such as tigers and zebras. Then, the notion of the already learned stripes is more strengthened through an inverse inference.

Therefore, even though the difficult tasks such as hyenas refer to the notion of the stripes, they do not have a significant influence on the learning. Describing the point of view of the asymmetric knowledge transfer direction, the knowledge transfer such as [(tiger, zebra)→stripes→hyena] happens, which may be considered as the inter-task knowledge transfer similar to the existing AMTL model. The model of the present disclosure is different from existing AMTL model in that it is based on the common features like the GO-MTL.

The AMTFL model according to the present disclosure is naturally expanded to the learning function in the deep neural network since a highest layer of the network includes an additional weight matrix for the feedback connection along with the original feedforward connection. The asymmetric transmission is permitted from each task predictor to a bottom layer. By doing so, the AMTFL model may take advantage of the high-end neural network models to obtain benefits from the development of recent deep learning.

Hereinafter, the contents of the asymmetric multi-task feature learning of the present disclosure will be described.

The asymmetric multi-task feature model is based on the basic idea of the AMTL model. The AMTL model has the feature that each task parameter is induced to be close to a linear combination of other task parameters as described above.

First, the given data is expressed by $\{(X_t, y_t)|X_t \in \mathbb{R}^{N_t \times d}, y_t \in \mathbb{R}^{N_t \times t}\}$. Here, T represents the total number of tasks, $N_t$ represents the number of data (instances) of the task t, and d represents a feature dimension. X represents a set of data instances, and yt represents a corresponding label.

On the other hand, the goal of the multi-task learning is to train the trained model using all the tasks (T) as in the general learning objective as in the following Equation 1.

$$\min_{W} \sum_{t=1}^{T} \mathcal{L}(w_t; X_t, y_t) + \Omega(W). \quad [\text{Equation 1}]$$

In the above Equation 1, represents a cross entropy loss (loss function) of the learning data, $w_t \in \mathbb{R}^d$ represents a model parameter for the task t, $W \in \mathbb{R}^{1 \times T}$ represents a column direction connection matrix defined by $W=[w_1 w_2 \ldots w_T]$. A penalty $\Omega$ represents a regularization term strengthening a specific dictionary assumption for the model parameter W.

One of the general assumptions is that there is a common latent reference set. Under the assumption, the matrix W may be decomposed into W=LS.

In the above Equation 1, $L \in \mathbb{R}^{d \times k}$ represents a latent base matrix expressed by k and $S \in \mathbb{R}^{k \times T}$ represents a coefficient matrix for being linearly coupled to the base matrix. As a result, the multi-task learning may be represented by the following Equation 2 using a regularization term $\Omega(L, S)$.

$$\min_{L,S} \sum_{t=1}^{T} \mathcal{L}(Ls_t; X_t, y_t) + \Omega(L, S). \quad [\text{Equation 2}]$$

In the above Equation 2, $s_t$ represents a t-th column vector of S, that is, $w_t = Ls_t$ which represents a base weight for the task t. From another viewpoint, L may be considered as a feature transformation, which may be regarded as the learning parameters $s_t$ for each task t by using the changed feature $x_t L$ for each instance i.

As a special case of the above Equation 2, for example, in the Go-MTL model, the L may be strengthened so that element-wisely $\ell_2$ is regularized and $s_t$ regresses.

$$\min_{L,S} \sum_{t=1}^{T} \{\mathcal{L}(Ls_t; X_t, y_t) + \mu \|s_t\|_1\} + \lambda \|L\|_F^2. \quad [\text{Equation 3}]$$

As another example, in the above Equation 3, the L becomes orthogonal, and s may be limited to be regularized to (2,1)-norm.

On the other hand, the task relevance may be used without assuming that there is a common set of latent bases. The AMTL is an example of the multi-task learning based on the assumption that each task parameter $w_t \in \mathbb{R}^d$ is reconstructed into a sparse combination of other task parameters $\{w_s\}_{s \neq t}$.

In other words, a weight $B_{st}$ of $w_s$ in $w_t \approx \sum_{s \neq t}^* B_{st} w_s$ may be reconstructed into $w_t$, which may be understood to be interpreted as the amount of knowledge transfer from the task $w_s$ to t. Since there is no symmetry constraint in the matrix B, it becomes possible to learn the asymmetric knowledge transfer direction from a more reliable task to a less reliable task. In consideration of this point, the multi-task learning problem of the AMTL may be solved by the following Equation 4.

$$\min_{W,B} \sum_{t=1}^{T} (1 + \mu \|b_t^o\|_1) \mathcal{L}(w_t; X_t, y_t) + \lambda \|WB - W\|_F^2. \quad [\text{Equation 4}]$$

$\mu$ and $\lambda$ represent model parameters for adjusting weights of each item. $W=[w_1, \ldots, w_T] \in \mathbb{R}^{d \times T}$ represents a concatenation of each $w_t$, $B \in \mathbb{R}^{T \times T}$ represents an inter-task transition matrix, and a $b_t^o$ vector represents each row of B.

In this case, all diagonal elements of the B are 0. In other words, each element of the $b_t^o$ represents how much knowledge the task t transfers to other tasks other than t.

A role of a $\lambda \|WB - W\|_F^2$ term in the above Equation 4 described above is to induce each task parameter based on the linear combination of other task parameters.

Meanwhile, the above Equation 3 has the disadvantage in that a severe negative transfer arises from noisy/difficult tasks to clean/easy tasks because all tasks contribute to the construction of the latent base alike.

In addition, the above Equation 4 has a disadvantage in that it cannot be expended to match the number of tasks and does not learn the explicit feature.

Thus, an effective method of overcoming the constraints of the two transition approaches described above and applying an asymmetric knowledge transfer to a deep neural network while preventing a negative transfer will now be described with reference to FIG. 4.

FIG. 4 is a diagram illustrating a feedback reconstruction according to an exemplary embodiment of the present disclosure.

Referring to FIG. 4, L is the learned base matrix and LS represents the learned model parameters.

First, the base features are reconstructed using the autoencoder framework. Specifically, new features $z=\sigma(xL)$ are obtained using the same L as the feature transformation. Here, $\sigma$ represents a nonlinear transformation (recified linear unit (RELU) may be utilized in implementation).

The st is learned on the transformed feature to obtain the model output. The model output is performed so as to reconstruct the latent features by introducing again the transformation A into the feature. That is, $\sigma(f(zS)A)=z$. Here, f of the last layer is the nonlinearity of the actual prediction (e.g., a softmax or sigmoid function for classification and a hyperbolic tangent function for regression). Using this reconstruction term, the multi-task feature learning Equation may be represented by the following Equation 5.

$$\min_{L,S,A} \sum_{t=1}^{T} \{\mathcal{L}(s_t; Z_t, y_t) + \mu\|s_t\|_1\} + \quad \text{[Equation 5]}$$

$$\gamma\|\sigma(f(ZS)A) - Z\|_2^2 + \lambda\|L\|_F^2.$$

Unlike the AMTL, the AMTFL assumes the explicit feature which is represented by $Z=\sigma(XL)$. In this case, L represents the latent base matrix forming features obtained by being multiplied by each X, and $\sigma$ represents any nonlinear function. When the number of elements of Z is k, $A\in\mathbb{R}^{T\times k}$ represents a matrix for the feedback connection in the task and is the most important variable in the AMTFL model. Each row vector $\alpha_t^o$ of A plays a similar role to $b_t^o$ in the AMTL, and each represents how much knowledge each task transfers to the feature elements. f represents a function (e.g., sigmoid, or softmax function) used for actual prediction at the last portion. $\alpha$, $\gamma$, $\lambda$ represents model parameters for adjusting the weights of each term.

A which weighs the difficulty of the task for the asymmetric learning transition from the task to the feature is limited. As a result, the easy and reliable task predictors more contribute to the latent features. The asymmetric multi-task feature trained model considering the point may be represented by the following Equation 6.

$$\min_{L,S,A} \sum_{t=1}^{T} \{(1+\alpha\|\alpha_t^o\|_1)\mathcal{L}(s_t; Z_t, y_t) + \mu\|s_t\|_1\} + \quad \text{[Equation 6]}$$

$$\gamma\|\sigma(f(ZS)A) - Z\|_2^2 + \lambda\|L\|$$

When the above Equation 6 is changed to Equation for multi layer, the above Equation 6 is as the following Equation 7.

$$\min_{A, \{W^{(l)}\}_{l=1}^{L}} \sum_{t=1}^{T} \{(1+\alpha\|\alpha_t^o\|_1)\mathcal{L}(w_t^{(L)}; Z_t, y_t) + \hat{\mathcal{L}}_t\} + \quad \text{[Equation 7]}$$

$$\gamma\|\sigma(f(ZW^{(L)})A) - Z\|_2^2 + \lambda\sum_{l=1}^{L}\|W^{(l)}\|_F^2,$$

In the above Equation 7, Z represents a learned deep matrix represented by $z_i=\sigma(W_{L-1}\sigma(W^{L-2}\ldots\sigma(x_iW^1)))$ in a layer L-1, $W^{(L)}$ represents a weight matrix for the last layer, and A represents a matrix of a feedback connection for a feature space z. $\alpha_t^o\in\mathbb{R}^{1\times K}$ represents a t-th row of an A vector.

Valid sparsity for $\|\alpha_t^o\|$ is $\alpha(\mathcal{L}_t+\hat{\mathcal{L}}_t)$, in which $\hat{\mathcal{L}}_t$ represents an average validation loss of single task learning for the task t and is $\mathcal{L}_t:=\mathcal{L}(w_t;Z_t^-,y_t)$ for simplifying a display.

It is to be noted that $\mathcal{L}_t$ alone may not be sufficient to capture an actual risk to reduce overfitting. Here, if several tasks have a low list, they will contribute to a construction of lower scarcity and latent base.

The loss function $\mathcal{L}(w;X;y)$ in the above Equations may be a general loss function. That is, general instances (a squared loss in $$\mathcal{L}(w_t; X_t, y_t) = \frac{1}{N_t}\|y_t - X_t w_t\|_2^2$$

in the regression task, and a logic loss $$\mathcal{L}(w_t; X_t, y_t) = \frac{1}{N_t}\sum_{i=1}^{N_t}\{y_{ti}\log\sigma(x_{ti}w_t) + (1-y_{ti})\log(1-\sigma(x_{ti}w_t))\}$$

in the classification task) may be used. Here, $\sigma$ is the sigmoid function.

Figure 5:
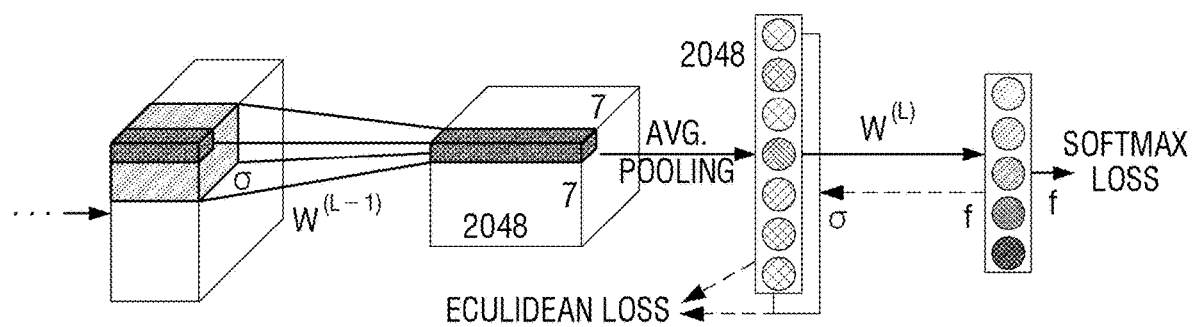
FIG. 5 is a diagram illustrating Deep-AMTFL according to an exemplary embodiment of the present disclosure.

FIG. 5 is a diagram illustrating Deep-AMTFL according to an exemplary embodiment of the present disclosure.

Referring to FIG. 5, the gray scale of the last layer represents the amount of actual risk measurement, the arrow in the upper direction represents the feedback connection, and the arrow in the down direction represents the feedforward step.

Figure 6:
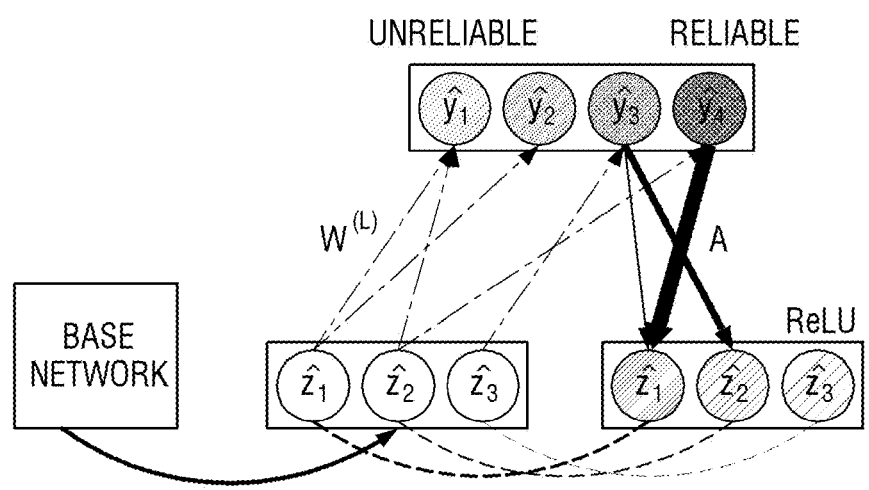
FIG. 6 is a diagram illustrating a layer of an AMTFL model seen in any base network.

FIG. 6 is a diagram illustrating a layer of an AMTFL model seen in any base network.

Referring to FIG. 6, a solid line and a one-dotted chain line represent the feedforward connection, and the dotted line and the elements represent the feedback connection and the knowledge transfer. The thickness of the line represents the amount of knowledge transferred to the feature portion by different amounts of reliability and feedback connections.

Hereinafter, the effects of the deep asymmetric multi-task feature learning method according to the present disclosure will be described with reference to FIGS. 7 to 11.

Specifically, the experimental results using the composite data set and the experimental results using the actual data sets will be described.

First, the trained model used in the experiment using the composite data set will be described below.

The first is STL. The STL uses a ridge regression model for regression analysis, a logistic regression model for classification, and a softmax regression model for multi-class classification as a linear single task trained model.

The second is the GO-MTL. The GO-MTL is a feature-sharing MTL model, and shares the latent reference in which different task prediction variables are common.

The third is the AMTL. The AMTL performs the knowledge transfer between the tasks through the parameter-based regularization by the asymmetric multi-task trained model as described above.

The fourth is NN. The NN is a simple feedforward neural network having a single hidden layer.

The fifth is a multi-task NN. The multi-task NN is similar to the NN, but adjusts the task loss using a value obtained by dividing the loss for each task by Nt. In this model, l1 regularization is applied in the last fully connected layer.

The sixth is the AMTFL. The AMTFL is the asymmetric multi-task feature learning according to the present disclosure.

Figure 7:
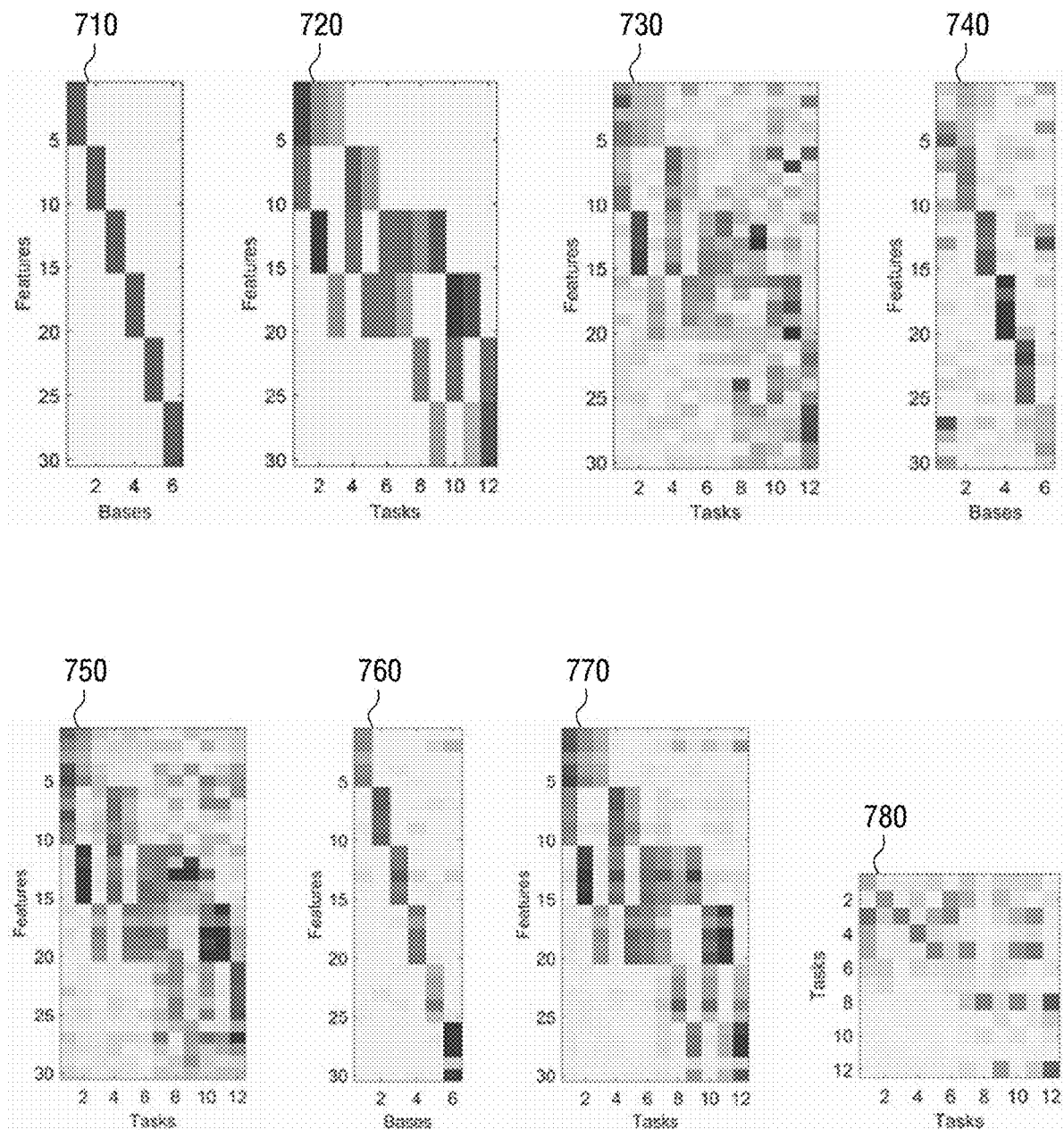
FIG. 7 is a diagram illustrating learned features and parameters with a composite data set.

FIG. 7 is a diagram illustrating learned features and parameters with a composite data set.

First, in order to obtain the image of FIG. 7, six 30-dimensional actual base matrices are generated first.

First, to facilitate Gaussian noise $N(0,\sigma)$, parameters for 12 tasks are generated and σ is divided to generate two groups based on a noise level (clean, noise). The clean task has a Gaussian noise level of σ=1, and the noisy task has σ=2. Each noisy task is selected from $\{l_3, \ldots l_6\}$, each clean task parameter is combined into two outputs of four bases $\{l_1, \ldots l_4\}$ to be linearly combined with $w_t \in \mathbb{R}^{30}$. As a result, the base $\{l_3, l_4\}$ overlaps each of the clean and noisy tasks, and the other bases are used exclusively in each group.

Four random learning/evaluation/test splits for each group ({50/50/100} of the clean task and {25/25/100} of the noise task) are generated.

To facilitate the comparison with the AMTFL, all base models are implemented with neural networks, and $\|L\|_1$ regularization is applied to all models for better reconstruction of L. The nonlinearity is removed from the hidden layer of the AMTFL, and all hyper parameters are found in separate valid sets. For the AMTL, non-negative constraints are removed based on the data set features.

Referring to FIG. 7, a first image 710 represents an actual base matrix and a second image 720 represents an actual model parameter.

A third image 730 represents the base matrix generated using the present disclosure, and a fourth image 740 represents the model parameter generated using the present disclosure.

A fifth image 750 represents the base matrix generated using the GO-MTL.

A sixth image 760 represents the model parameter generated using the GO-MTL.

A seventh image 770 represents a model parameter result generated by the learning in the AMTL, and an eighth image 780 represents a task transfer function matrix.

Comparing the third image 730 with the fifth image 750 in FIG. 7, it may be confirmed that the base matrix 730 according to the present disclosure rather than the base matrix 750 learned using the GO-MTL is similar to the actual base matrix 710.

Also, comparing the fourth image 740, the sixth image 760, and the seventh image 770 with each other, it may be confirmed that the learned model parameter 740 according to the present disclosure rather than the actual model parameter 760 using the GO-MTL and the model parameter 770 learned in the AMTL is similar to the actual model parameters 720 and includes the least amount of noise. This is because the knowledge transfer from the task to the feature gives a significant help to the learning.

Also, referring to the eighth image (780), it may be confirmed that there is no portion where knowledge transfers from difficult tasks (tasks 7 to 12) to easy tasks (tasks 1 to 6).

Figure 8:
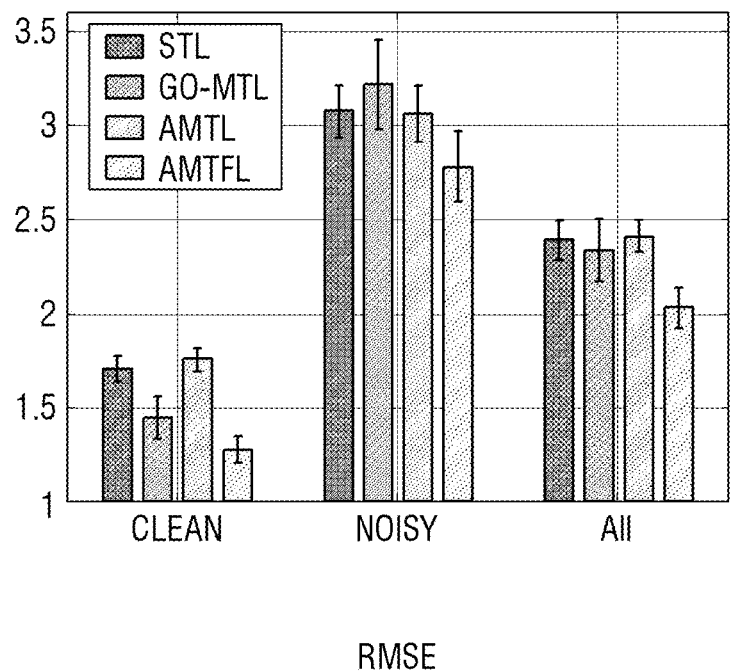
FIG. 8 is a diagram illustrating a quantitative evaluation result of various trained models.

FIG. 8 is a diagram illustrating a quantitative evaluation result of various trained models.

Referring to FIG. 8, it may be confirmed that the AMTFL according to the present disclosure is superior to the conventional schemes. Specifically, it may be confirmed that the AMTFL according to the present disclosure has a relatively lower error for both clean and noise tasks, but the GO-MTL has a higher error than the STL for the noisy task. This is determined due to the negative transfer from the noisy task.

Comparing with the AMTL, it may be confirmed that the AMTFL according to the present disclosure is superior. Specifically, the AMTL is difficult to find the significant inter-task connections in a particular composite data set, even though it is assumed that data for each task is generated from the same set of bases.

Figure 9:
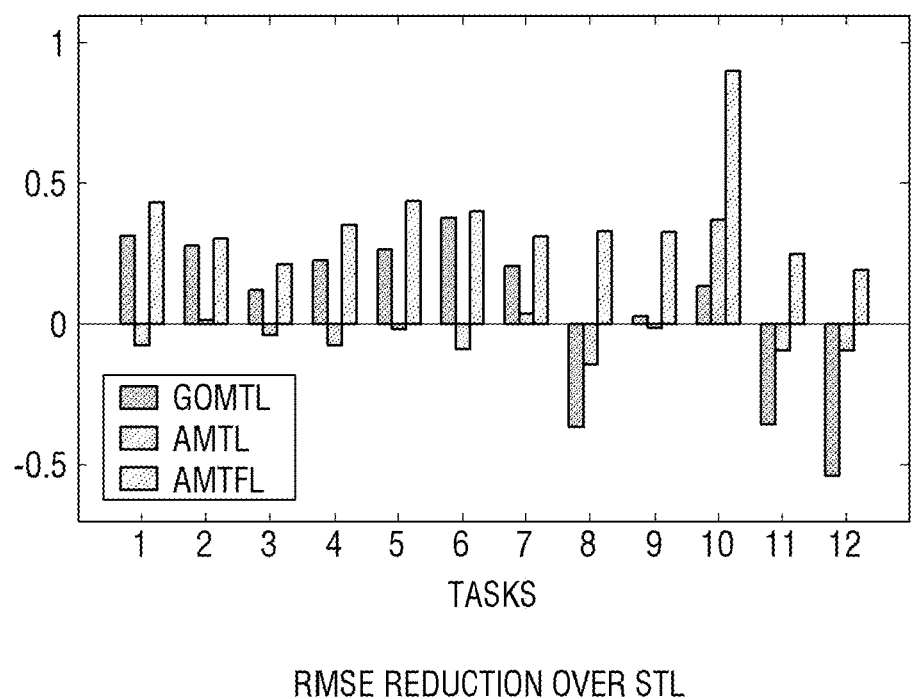
FIG. 9 is a diagram illustrating root mean square error reduction per task over STL.

FIG. 9 is a diagram illustrating error reduction per task over STL.

Referring to FIG. 9, it may be confirmed that while the GO-MTL suffers from the negative transfer, the AMTFL effectively prevents the negative transfer and provides greater improvement than the AMTL.

Figure 10:
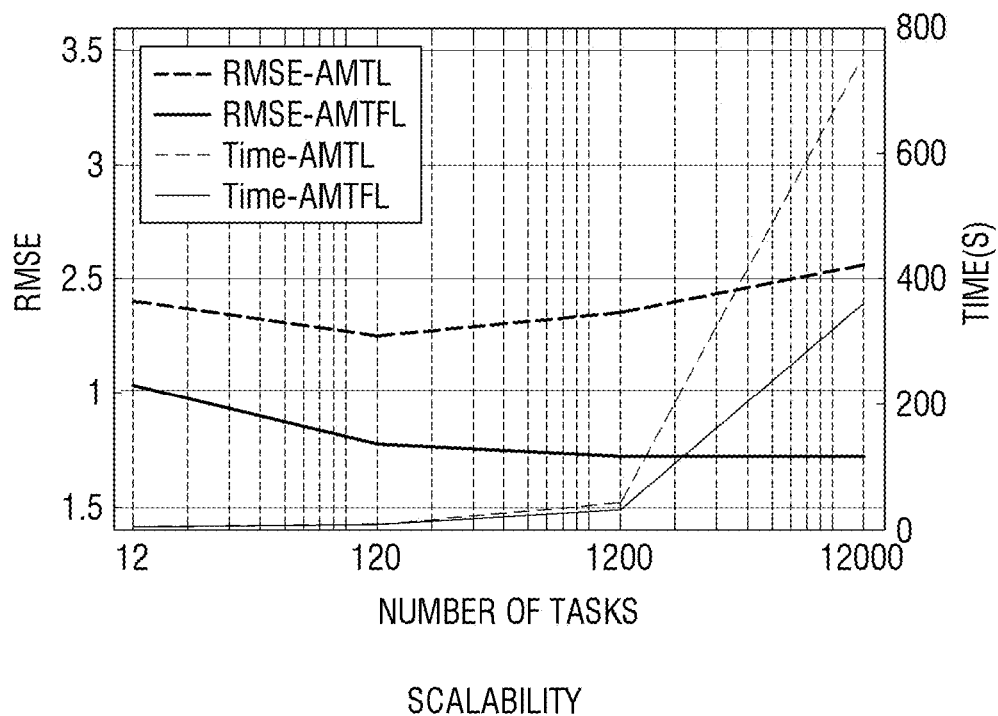
FIG. 10 is a diagram illustrating an error reduction and a learning time according to the increased number of tasks.

FIG. 10 is a diagram illustrating an error reduction and a learning time according to an increased number of tasks.

Referring to FIG. 10, it may be confirmed that the AMTFL according to the present disclosure is superior to the AMTL in terms of the error reduction and the learning time. In particular, if the number of tasks is increased, it may be confirmed that such superiority is noticeable.

Hereinafter, the trained model and the actual data set used in the experiment using the actual data set will be described.

1) AWA-Attr: This is a set of classification data consisting of 30475 images. The task predicts 85 binary features for each image describing a single animal.

2) MNIST: This is a standard data set for classification which consists of 60000 numbers for learning 28×28 images represented by decimal numbers and 10000 numbers for task.

3) School: This is a regression data set which predicts test scores of 15362 students in 139 schools. A test score prediction of each school is considered as one task.

4) ImageNet-Room: This is a subset of the ImageNet data set and classifies 14140 images into 20 indoor scene classes.

FIG. 11 is a diagram illustrating experimental results of two models applied to an actual data set.

Referring to FIG. 11, it may be confirmed that the AMTFL according to the present disclosure has better performance than the conventional method for most data sets.

Hereinafter, four deep models and experimental results thereof are described.

1) DNN: This is a general deep neural network with the loss of the softmax without feedback connections.

2) Multi-tasking DNN: This is a value obtained by dividing the DNN having softmax loss for each task divided by Nt (the number of positive instances for each class).

3) Deep-AMTL: This is the same as the multi-tasking DNN, but the asymmetric multi-task learning is to replace the original softmax loss.

4) Deep-AMTFL: This is a deep asymmetric multi-task feature trained model of the present disclosure.

For the deep model experiments, CIFAR-100, AWA, and ImageNet-Small are used as data sets.

A Caffe framework is used to implement the existing model and the deep model of the present disclosure. In the case of the DNN and the multi-tasking DNN, the model is learned from the beginning, and the rest models are generated in the multi-tasking DNN for fast learning.

For the task trust term $\hat{\mathcal{L}}_t$ of the deep-AMTFL, $$\hat{\mathcal{L}}_t = \mathcal{L}_t + \frac{\sigma}{N_t}$$

. . . .

is used as a proxy of an actual risk for each task. Specifically, the use of the validation loss is not practical because the model needs to learn twice. Similarly, in principle, even the σ should be found by the cross verification, but modified σ is used based on the imbalance that the $\hat{\mathcal{L}}_t$ is large enough. In addition, a value of a reasonable figure is set without using a wide range of hyperparameter search in order to find the parameters such as α and λ in the above Equation 7.

FIG. 12 is a diagram illustrating quantitative evaluation in a plurality of deep models.

Referring to FIG. 12, it may be confirmed that the performance of the Deep-AMTFL of the present disclosure is superior to that of other models including the Deep-AMTL, which demonstrates the effect of the asymmetric multi-task feature learning in the deep learning framework.

Figure 13:
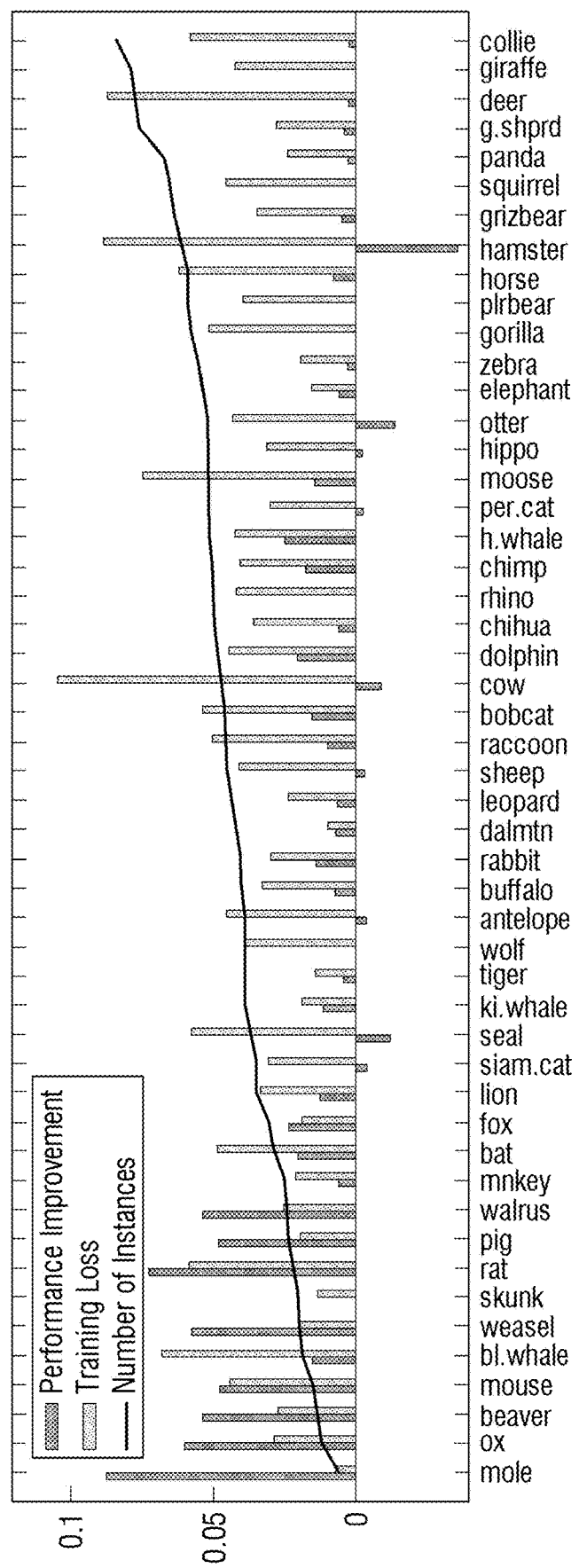
FIG. 13 is a diagram illustrating results of a task unit for an AWA data set.

FIG. 13 is a diagram illustrating results of a task unit for an AWA data set.

Referring to FIG. 13, it may be confirmed that the AMTFL has better performance than that of the existing CNN in 41 out of 50 classes and does not have the degraded performance except for a few classes.

These results show that the performance improvement is mostly due to the suppression of the negative transfer.

Figure 14:
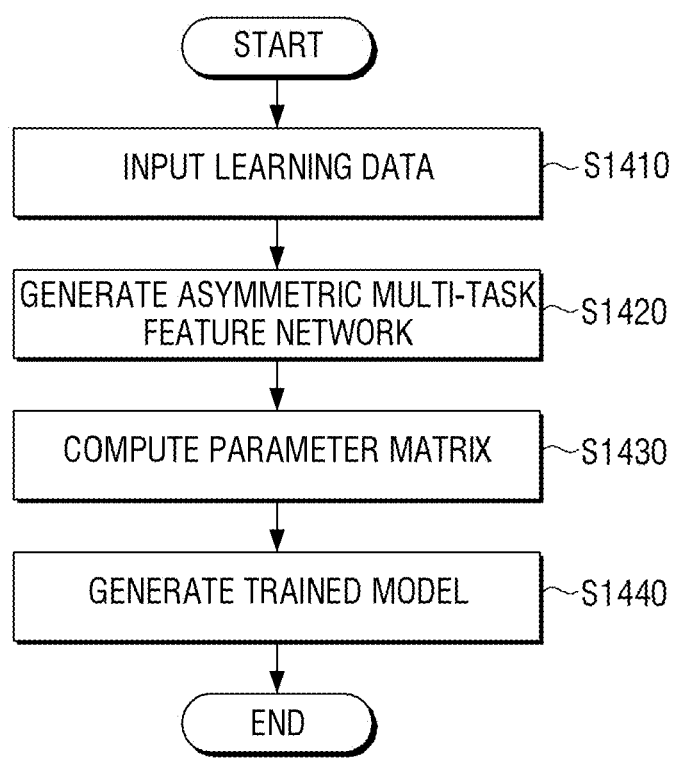
FIG. 14 is a diagram illustrating a method for generating a trained model according to an exemplary embodiment of the present disclosure.

FIG. 14 is a diagram illustrating a method for generating a trained model according to an exemplary embodiment of the present disclosure.

The learning data is received (S1410). Specifically, various data sets necessary for the learning may be received, and the corresponding learning data may be previously input and stored upon the implementation.

The asymmetric multi-task feature network having the parameter matrix of the trained model permitting the asymmetric knowledge transfer between the tasks and the feedback matrix for the feedback connection from the tasks to the features is generated (S1420). Specifically, the neural network with the feedback connection as illustrated in FIG. 4 may be generated.

The parameter matrix of the asymmetric multi-task feature network is computed using the input learning data to minimize the predetermined objective function (S1430). Specifically, the parameter matrix of the network may be computed by minimizing the objective function as in the above Equation 7 using the stochastic gradient descent method.

The asymmetric multi-task feature trained model is generated using the computed parameter matrix as the parameter of the generated asymmetric multi-task feature network (S1440).

As a result, the method for generating a trained model according to the present disclosure may solve the negative transfer caused by the symmetrical influence of each task during the learning process for the feature. Further, the method for generating a trained model according to the present disclosure may generate the trained model in which the negative transfer is resolved, and thus may generate the trained model similar to the actual model. The method for generating a trained model as illustrated in FIG. 14 may be executed on the electronic apparatus having the configuration of FIG. 1 or 2, or may be performed on an electronic apparatus having another configuration.

Further, the method for generating a trained model as described above may be implemented in programs including algorithm which may be executed in a computer and the programs may be provided while being stored in a non-transitory computer readable medium.

The non-transitory computer readable medium is not a medium that stores data therein for a while, such as a register, a cache, a memory, or the like, but means a medium that semi-permanently stores data therein and is readable by a device. In detail, programs for performing various methods described above may be stored and provided in the non-transitory computer readable medium such as a compact disk (CD), a digital versatile disk (DVD), a hard disk, a Blu-ray disk, a universal serial bus (USB), a memory card, and a read only memory (ROM).

Although the preferred embodiments of the present disclosure have been disclosed for illustrative purposes, those skilled in the art will appreciate that various modifications, additions and substitutions are possible, without departing from the scope and spirit of the present disclosure as disclosed in the accompanying claims. Accordingly, such modifications, additions and substitutions should also be understood to fall within the scope of the present disclosure.

What is claimed is:

1. A method for generating an asymmetric multi-task feature trained model, comprising:
   receiving a learning data;
   generating an asymmetric multi-task feature network including a first parameter matrix of the trained model which permits an asymmetric knowledge transfer between tasks and a feedback matrix for a feedback connection from the tasks of the first parameter matrix to features of the first parameter matrix;
   computing a second parameter matrix of the asymmetric multi-task feature network using the received learning data to minimize a predetermined objective function; and
   generating an asymmetric multi-task feature trained model using the second parameter matrix as parameters of the generated asymmetric multi-task feature network,
   wherein the feedback matrix is an additional weight matrix for the feedback connection along with an original feedforward connection.

2. The method as claimed in claim 1, wherein the predetermined objective function includes a loss function for the trained model which permits the asymmetric knowledge transfer, an auto-encoder term using the feedback matrix and inducing a nonlinear combination of task parameters, and a weight decay regularization term.

3. The method as claimed in claim 1, wherein the predetermined objective function is:

$$\min_{A, \{W^{(l)}\}_{l=1}^{L}} \sum_{t=1}^{T} (1 + \alpha \|a_t^o\|_1) \{\mathcal{L}(w_t^{(L)}; Z_t, y_t) + \hat{\mathcal{L}}_t\} + \gamma \|\sigma(f(ZW^{(L)})A) - Z\|_2^2 + \lambda \sum_{l=1}^{L} \|W^{(l)}\|_F^2,$$

wherein Z represents a matrix of the asymmetric multi-task feature network configured of a multi layer, $W^{(L)}$ represents a weight matrix for the last layer of the asymmetric multi-task feature network, A represents the feedback matrix, $\alpha_t^o \in \mathbb{R}^{1 \times K}$ represents a t-th row of an A vector, $\hat{L}_t$ represents an average validation loss of single task learning for a task t, $\mathcal{L}_t := \mathcal{L}(w_t^{(L)}, W^{(L-1)}, \ldots W^{(1)}:X_t, y_t)$, σ represents a nonlinear function, and α, γ, λ each represent model parameters for adjusting weights of each term.

4. The method as claimed in claim 1, wherein the asymmetric multi-task feature network includes a plurality of hidden layers.

5. An electronic apparatus, comprising:
a memory storing a learning data; and
a processor configured to:
generate an asymmetric multi-task feature network which has a first parameter matrix of a trained model permitting an asymmetric knowledge transfer between tasks and a feedback matrix for a feedback connection from the tasks of the first parameter matrix to features of the first parameter matrix,
compute a second parameter matrix of the asymmetric multi-task feature network using the stored learning data to minimize a predetermined objective function, and
generate an asymmetric multi-task feature trained model using the second parameter matrix as parameters of the generated asymmetric multi-task feature network,
wherein the feedback matrix is an additional weight matrix for the feedback connection along with an original feedforward connection.

6. The electronic apparatus as claimed in claim 5, wherein the predetermined objective function includes a loss function for the trained model which permits the asymmetric knowledge transfer, an auto-encoder term using the feedback matrix and inducing a nonlinear combination of task parameters, and a weight decay regularization term.

7. The electronic apparatus as claimed in claim 5, wherein the predetermined objective function is:

$$\min_{A, \{W^{(l)}\}_{l=1}^{L}} \sum_{t=1}^{T} (1 + \alpha \|a_t^o\|_1) \{\mathcal{L}(w_t^{(L)}; Z_t, y_t) + \hat{\mathcal{L}}_t\} + \gamma \|\sigma(f(ZW^{(L)})A) - Z\|_2^2 + \lambda \sum_{l=1}^{L} \|W^{(l)}\|_F^2,$$

wherein Z represents a matrix of the asymmetric multi-task feature network configured of a multi layer, $W^{(L)}$ represents a weight matrix for the last layer of the asymmetric multi-task feature network, A represents the feedback matrix, $\alpha_t^o \in \mathbb{R}^{1 \times K}$ represents a t-th row of an A vector, $\hat{\mathcal{L}}_t$ represents an average validation loss of single task learning for a task t, $\mathcal{L}_t := \mathcal{L}(w_t^{(L)}, W^{(L-1)}, \ldots W^{(L)}:X_t, y_t)$, σ represents a nonlinear function, and α, γ, λ each represent model parameters for adjusting weights of each term.

8. The electronic apparatus as claimed in claim 5, wherein the asymmetric multi-task feature network includes a plurality of hidden layers.

9. A non-transitory computer readable recording medium including a program for executing a method for generating an asymmetric multi-task feature trained model in an electronic apparatus, wherein the method for generating the asymmetric multi-task feature trained model comprises:
receiving a learning data;
generating an asymmetric multi-task feature network including a first parameter matrix of the trained model which permits asymmetric knowledge transfer between tasks and a feedback matrix for a feedback connection from the tasks of the first parameter matrix to features of the first parameter matrix;
computing a second parameter matrix of the asymmetric multi-task feature network using the received learning data to minimize a predetermined objective function; and
generating an asymmetric multi-task feature trained model using the second parameter matrix as parameters of the generated asymmetric multi-task feature network,
wherein the feedback matrix is an additional weight matrix for the feedback connection along with an original feedforward connection.

* * * * *